United States Patent [19]
Keske et al.

[11] 4,309,528
[45] Jan. 5, 1982

[54] INJECTION MOLDABLE AMIDE-IMIDE COPOLYMERS

[75] Inventors: Robert G. Keske; James R. Stephens, both of Naperville, Ill.

[73] Assignee: Standard Oil Company (Indiana), Chicago, Ill.

[21] Appl. No.: 112,653

[22] Filed: Jan. 16, 1980

[51] Int. Cl.³ ............................................. C08G 73/14
[52] U.S. Cl. ............................... 528/188; 264/331.12; 264/331.19; 528/125; 528/128; 528/172; 528/173; 528/185; 528/189; 528/226; 528/229; 528/335; 528/337; 528/348; 528/352; 528/350
[58] Field of Search ............... 528/350, 335, 337, 226, 528/229, 348, 172, 185, 188, 189, 352, 173

[56] References Cited

U.S. PATENT DOCUMENTS

| 2,421,024 | 5/1947 | Summit | 528/350 |
| 3,654,227 | 4/1972 | Dine-Hart | 528/350 |
| 3,661,863 | 5/1972 | Campbell | 528/350 |
| 3,817,942 | 6/1974 | Kovacs et al. | 528/350 |
| 3,842,026 | 10/1974 | Dixon et al. | 528/229 X |
| 3,862,092 | 1/1975 | Flowers et al. | 528/350 |
| 4,066,631 | 1/1977 | Dimmig | 528/350 |

FOREIGN PATENT DOCUMENTS 570858 7/1945 United Kingdom ............... 528/350

Primary Examiner—Howard E. Schain
Attorney, Agent, or Firm—Gunar J. Blumberg; William H. Magidson; William T. McClain

[57] ABSTRACT

Injection moldable copolymers are prepared from fully or partially acylated aromatic diamines and aromatic tricarboxylic anhydride compounds or mixtures of tricarboxylic anhydrides and dicarboxylic acids. These copolymers are useful for the preparation of injection molded articles and fibers.

19 Claims, No Drawings

INJECTION MOLDABLE AMIDE-IMIDE COPOLYMERS

BACKGROUND OF THE INVENTION

1. Field of the Invention

The field of the invention relates to the preparation of random linear injection moldable amide-imide copolymers which process comprises reacting fully or partially acylated aromatic diamines with aromatic tricarboxylic acid anhydrides or mixtures of aromatic tricarboxylic acid anhydrides and aromatic dicarboxylic acids and to novel polytrimellitic amide-imide copolymers and to molded objects and fibers prepared from these copolymers.

2. Background

Amide-imide and polyamide polymers and copolymers are a relatively new class of organic compounds known for their solubility in nitrogen containing solvents when in the polyamic acid form. The major application of these amide-imides has been as wire enamels and film formers. This is illustrated in U.S. Pat. Nos. 3,852,106 (1974), 3,817,942 (1974), 3,661,832 (1972), 3,454,890 (1970) and 3,347,942 (1967).

Polyimide and polyamide-imide polymers have also been found useful for molding applications as shown in U.S. Pat. Nos. 4,016,140 (1977), 3,654,227 (1972) and 3,573,260 (1971).

The general object of this invention is to provide injection moldable amorphous linear amide-imide copolymers. A more specific object of this invention is to provide a novel process for the manufacture of injection moldable amide-imide and amide copolymers by reacting fully or partially acylated aromatic diamines with aromatic tricarboxylic acid anhydrides or mixtures of aromatic dicarboxylic acids and aromatic tricarboxylic acid anhydrides. Another object is to provide novel polyamide-imide copolymers suitable for use as an engineering plastic particularly for and in injection molding. Other objects appear hereinafter.

We have discovered a novel melt condensation process in which fully or partially acylated aromatic diamines are reacted with aromatic tricarboxylic anhydrides or mixtures of aromatic tricarboxylic anhydrides with aromatic dicarboxylic acids to yield engineering plastics suitable for injection molding which feature very high tensile strength and heat distortion temperatures. Our novel process for the preparation of random linear injection moldable amide-imide and amide copolymers comprises reacting fully or partially acylated aromatic diamines with aromatic tricarboxylic acid anhydrides or mixtures of aromatic tricarboxylic acid anhydrides with aromatic dicarboxylic acids in a molar ratio of about 9:1 to about 1:9 at a temperature of about 450° to 750° F.

In the prior art, melt reaction of tricarboxylic acid anhydride compounds with aromatic diamines have produced products which are not suitable for injection molding application. The reason for this is not known, but it is specified that various side reactions occur. It has now been discovered that when fully or partially acylated diamines are reacted, injection molding grade polyamide-imide copolymers are produced. In our process we usually acylate more than half of the diamines utilized in the reaction. The preferred acylation is about 70 to 100 percent.

Evidence for linearity for our novel copolymer is demonstrated by the solubility of the polymer. Polymers produced from tricarboxylic acid anhydride compounds such as trimellitic acid anhydride and aromatic diamines via various melt polymerization methods show no solubility for products having inherent viscosity in excess of 0.5. The copolymer produced according to the novel process utilizing partially or fully acylated diamines is essentially soluble after curing with inherent viscosities in the range of 0.6 to 3.0. For the purpose of this invention, inherent viscosity is measured at 25° C. and 0.5% w/v in 100% sulfuric acid or N-methylpyrrolidone.

The novel injection moldable amorphous random linear polyamide-imide copolymers of this invention comprise units of

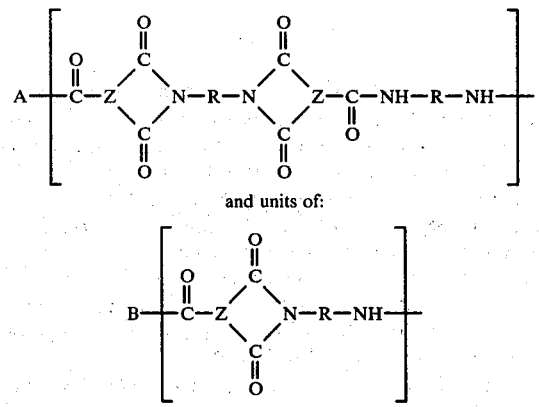

and units of:

R comprises $R_1$ and $R_2$, $R_1$ and $R_2$ are divalent aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

The novel injection moldable random linear copolymer may comprise structural Units A and B and also include Unit C of the following formula:

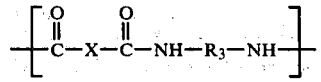

wherein X is a divalent aromatic radical usually a divalent benzene radical and $R_3$ comprises both $R_1$ and $R_2$ as defined above or is equal to $R_1$. Furthermore, if structure C is present R of structural Units A and B can be equal to $R_1$ or comprise both $R_1$ and $R_2$ as set forth above.

In the foregoing structural units Z is a trivalent aromatic radical. Z may be a trivalent radical of benzene, naphthalene, biphenyl, diphenyl ether, diphenyl sulfide, diphenyl sulfone, ditolyl ether, and the like.

Useful aromatic tricarboxylic acid anhydrides which contribute the trivalent radical moiety of Z include those compounds containing at least one pair of carboxyl groups in the ortho position with respect to each other or otherwise situated in a fashion which permits the formation of an anhydride structure, one other carboxyl group and from 9 to 21 carbon atoms. Within these limits, these compounds may contain one or more benzenoid rings such as, for instance, trimellitic anhydride and its isomers and multi-ring compounds such as the 1,8-anhydride of 1,3,8-tricarboxylnaphthalene. Usually these compounds contain up to three benzenoid rings.

The aromatic tricarboxylic acid anhydride used in the novel process to form the polyamide-imide polymers of this invention is of the formula:

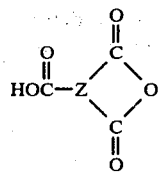

where Z is a trivalent aromatic radical defined as set forth hereinabove. The following aromatic tricarboxylic anhydrides are preferred: trimellitic acid anhydride; 2,3,6-naphthalene tricarboxylic anhydride; 1,5,6-naphthalene tricarboxylic anhydride, and the like; 2,6-dichloronaphthalene-4,5,7-tricarboxylic anhydride, and the like. One of the preferred aromatic tricarboxylic anhydrides is trimellitic anhydride since this compound is readily available and forms polymers having excellent physical properties of tensile strength and elongation and is resistant to high temperatures.

Suitable fully or partially acylated aromatic diamines useful in applicant's process include para- and meta-phenylenediamine, oxybis (aniline), thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1977) both incorporated herein by reference.

Useful aromatic dicarboxylic acids include isophthalic acid and terephthalic acid. In applicant's process further preparation of injection moldable amide-imide and amide copolymers process can be conducted without utilizing a solvent or fluidizing agent though it is preferred to use agents such as N-methylpyrrolidone, dimethyl-acetamide, or acetic acid for the initial mixing of reactants. In general, since these polymers are linear, they may be easily cured in the melt using a twin screw extruder as the finishing reactor instead of a solid state polymerization. However, in some instances, it may be helpful to solid state polymerize the copolymers. The term "solid state polymerization" refers to chain extension of polymer particles under conditions where the polymer particles contain their solid form and do not become a fluid mass.

The solid state polymerizing can be carried out below the melting point of the copolymer and can be conducted in several ways. However, all the techniques require heating the ground or pelletized copolymer below the copolymer melting point, generally of about 400° to 600° F. while either sparging with an inert gas such as nitrogen or air or operating under vacuum.

Injection molding of the novel copolymer is accomplished by injecting the copolymer into a mold maintained at a temperature of about 350°-500° F. In this process a 0.1-2.0 minutes cycle is used with a barrel temperature of about 500° F. to 700° F. The injection molding conditions are given in Table I.

TABLE I

| Mold Temperature | 350-500° F. |
|---|---|
| Injection Pressure | 2,000-40,000 psi and held for 0.5-20 seconds |
| Back Pressure | 0-400 psi |
| Cycle Time | 6-120 seconds |
| Extruder: | |
| Nozzle Temperature | 500° F. to 700° F. |
| Barrels: | |
| Front heated to | 500° F. to 700° F. |
| Screw: | |
| 10-200 revolutions/minute | |

The mechanical properties of the polymers prepared in the Examples are given in Tables II, III, IV, V, VI and VII.

In applicant's process the acylated aromatic diamines need not be isolated or purified prior to their further reaction with the tricarboxylic acid anhydride compound or mixture of the tricarboxylic acid anhydride with dicarboxylic acid. Therefore, one can react one to two moles of acetic anhydride or acid or propionic anhydride or acid or any other $C_2$ through $C_8$ containing aliphatic anhydride or acid and one mole of the appropriate aromatic diamine or diamine mixture and use the resulting diacylated diamine solution in acetic acid or propionic acid to react with the tricarboxylic anhydride compound, or mixtures of the tricarboxylic anhydride compound with dicarboxylic acid.

In most cases, linear high molecular weight polyamide-imide polymers result after melt and/or solid state polymerization.

The following examples illustrate the preferred embodiments of this invention. It will be understood that these examples are for illustrative purposes only and do not purport to be wholly definitive with respect to the conditions or scope of the invention.

The novel process can suitably be conducted as a continuous process, which process comprises reacting fully or partially acylated aromatic diamines with aromatic tricarboxylic acid anhydrides or mixtures of aromatic dicarboxylic acids and aromatic tricarboxylic acid anhydrides in a molar ratio of about 9:1 to 1:9 at a temperature of about 450° to 750° F. and wherein the molar ratio of the acylated diamines to the anhydride or acid and anhydride mixture is 0.9:1 to 1.1:1.

EXAMPLE 1

Metaphenylenediamine (540 g) and acetic acid (900 ml) were placed in a five liter three-necked round bottom flask equipped with mechanical stirrer, pressure equalizing addition funnel and nitrogen sparge tube, and distillation head and condenser. The nitrogen sparge was set at 300 cc/min and 765 g of acetic anhydride was added over 5 min. This was followed by the addition of 415 g of isophthalic acid and 480 g of trimellitic anhydride. The temperature of the bottom half of the spherical heating mantle surrounding the flask was set at 700° F. and the top half of the mantle was heated with a Variac set at 50. After 105 min., 1730 ml of distillate was collected and the polymer had become very viscous. The heat was turned off and the polymer was cooled under nitrogen. The inherent viscosity of the polymer 0.5% w/v in 60:40 w/w phenol:tetrachloroethane at 25° C. was 0.14 dl/g.

EXAMPLE 2

Oxybisaniline (OBA) (280 g), metaphenylenediamine (MPDA) (64.8 g), and 500 ml of N-methylpyrrolidone (NMP) were charged into a 3 liter 3-necked flask equipped with a metal-blade, metal shaft stirrer, pressure-equalizing addition funnel with nitrogen inlet, and a distillation take off. After flushing the flask with nitrogen and keeping a slow bleed, acetic anhydride (204 g) was added over 5 min. to this stirred mixture during which time the exothermic acylation raised the temperature to 175°–200° F. Trimellitic anhydride (384 g) was added quickly to this solution. After a short induction period, the TMA dissolved and reacted as evidenced by a further rise in solution temperature to 250° F. Finally 2 g of trisnonylphenylphosphite was added to the solution. The temperature of the bottom half of the spherical heating mantle surrounding the flask was set to 600° F., while a Variac connected to the top half was set to 50. After 80 min. of heating, 730 ml of solvent, water, and acetic acid had distilled, during which time an extremely viscous polymer was formed. The polymer was soluble in 60:40 w/w phenol:tetrachloroethane (TCE), NMP, and 100% sulfuric acid. Its inherent viscosity (0.5% w/v in 60:40 w/w phenol:TCE) was 0.23. The polymer was cured under high vacuum overnight at 270° C. to give material with an inherent viscosity of 1.36 in 100% sulfuric acid or 0.80 in NMP (0.5% w/v at 25° C.). The polymer could be easily compression molded (5 min. at 700° F.) to produce specimens with a tensile strength of 6,500 psi. Annealing these parts 16 hr. at 450° F. and 100 hr. at 500° F. produced specimens (without distortion) having a tensile strength of 14,000 psi.

EXAMPLE 3

Example #2 was repeated with the exception that 396 g of methylenebisaniline was substituted for the mixture of OBA and MPDA. Polymer was produced which had an inherent viscosity of 0.23 in 60:40 w/w phenol:tetrachloroethane or 0.25 in 100% sulfuric acid. Curing the polymer 16 hr. at 270° C. under high vacuum raised the inherent viscosity to 1.43 in 100% sulfuric acid. The polymer could be compression molded at 700° F. to produce amber glass colored plaques.

EXAMPLE 4

Fully aromatic TMA:oxybisaniline:metaphenylene diamine (MPDA) (in a molar ratio of 1:0.7:0.3) polyamide imide were prepared according to the procedure set forth in Example 3 and the copolymer had an inherent viscosity of 0.35. The copolymer was then solid state polymerized raising the inherent viscosity to 0.80. The resulting copolymer was then injected on the Arburg injection molding equipment using mold temperatures of 410° F. to 440° F. and barrel temperatures of 610° F. to 640° F. Some of the molded specimens were then annealed for 48 hours at 470° F. followed by 96 hours at 500° F. The physical properties of these copolymers are listed in Table II. Also a small rod ¼" in diameter was extruded from the Arburg injection molder. Annealing this sample from this rod produced molded products having good physical properties. They had tensile strength of 25,600 to 26,100 p.s.i., elongation of 9.5% and flexural strength of 32,600 to 35,600. After annealing, the copolymer is still soluble up to 90% with very little change in inherent viscosity taking place.

TABLE II

Properties of Injection Molded Fully Aromatic Amide-Imide Polymer (OBA:MPDA 70:30)

|  | ASTM Method |  |  |  |
|---|---|---|---|---|
| Mold Temperature, °F. |  | 440 | 410 | 440 |
| Annealed |  | No | Yes | Yes |
| Tensile Strength, psi | D-638 | 16,800 | 26,100 | 25,600 |
| Tensile Modulus, psi | D-638 | 585,000 | 524,000 | 519,000 |
| Percent Elongation | D-638 | 3.8 | 9.5 | 9.6 |
| Flexural Strength, psi | D-790 | 23,100 | 35,600 | 32,600 |
| Flexural Modulus, psi | D-790 | 682,000 | 711,000 | 644,000 |
| Tensile Impact, ft-lb/in$^2$ | D-1822 | 12.0 | 87.7 | 64.6 |
| H.D.T. @ 264 psi, °F. | D-648 | 480° F. | — | — |

EXAMPLE 5

Copolymers were prepared as in Example 4, but polymers with different inherent viscosities were injected to mold an 8½" long Type I tensile bar. The molding was done on a 10 ounce Stokes molding machine. These copolymers were easy to anneal and the properties before and after annealing are listed in Table III.

TABLE III

Mechanical Properties of the Injection Molded TMA:OBA:MPDA 10:7:3 Polymer from Type I Tensile Specimens

|  | As Molded | Annealed$^a$ | ASTM Method |
|---|---|---|---|
| Tensile Strength, psi | 9,900 | 23,700 | D-638 |
| Tensile Modulus, psi | 698,000 | 661,000 | D-638 |
| Percent Elongation | 2.1 | 9.7 | D-638 |
| Flexural Modulus, psi | 770,000 | 680,000 | D-790 |
| Izod, ft-lb/in notch | 0.53 | 1.7 | D-756 |
| Shrinkage |  | 2.5% |  |

$^a$16 hr @ 480° F., 24 hr @ 490, 72 @ 500.

EXAMPLE 6

Melt preparation of copolymer TMA:OBA:MPDA 10:6:4

Oxybisaniline (480 g), metaphenylenediamine (172.8 g) and acetic acid (945 g) was charged into a five-liter three-necked flask equipped with a metal-blade, metal shaft stirrer, pressure equalizing addition funnel with nitrogen inlet, and a distillation take-off. After flushing the flask with nitrogen and keeping a slow bleed, acetic anhydride (408 g) was added over two minutes. This was followed by the addition of 768 g of trimellitic anhydride over one minute. The temperature of the bottom half of the spherical heating mantle surrounding the flask was set at 725° F. and the Variac connected to the top half was set at 50. After 86 minutes approximately 1400 ml of distillate was collected, the polymer was briefly held under low vacuum (20 in Hg) and then cooled under nitrogen. Its inherent viscosity (0.5% w/v in NMP @ 25° C.) was 0.24. The polymer was cured under high vacuum (0.8 mm Hg) for 16 hr @ 535° F. increasing its inherent viscosity to 0.75. The physical properties are set forth in Table IV.

TABLE IV

Mechanical Properties of the Injection Molded TMA:OBA:MPDA 10:6:4 Polymer

|  | As Molded | Annealed$^a$ | ASTM Method |
|---|---|---|---|
| Tensile Strength, psi | 12,400 | 26,500 | D-638 |
| Percent Elongation | 3.7 | 12.1 | D-638 |
| Flexural Strength, psi | 28,100 | 32,500 | D-790 |
| Flexural Modulus, psi | 674,000 | 652,000 | D-790 |
| Izod, ft-lb/in notch | 1.5 | 3.5 | D-256 |

TABLE IV-continued

Mechanical Properties of the Injection Molded
TMA:OBA:MPDA 10:6:4 Polymer

|  | As Molded | Annealed[a] | ASTM Method |
|---|---|---|---|
| H.D.T. @ 264 psi | 513 | 532 | D-648 |
| Shrinkage,[b] % |  | 0.7 |  |

[a] 16 hr @ 495, 24 hr @ 505, 24 hr @ 519.
[b] In length of D1708 tensile bar during annealing.

Samples of this copolymer were annealed under different conditions to determine the effect of annealing upon physical properties and dimensional stability of the test specimens. Results of the mechanical property tests are listed in Table V. Annealing cycles are also set forth in Table V.

TABLE V

Effect of Annealing Cycle on Properties of the Injection Molded
TMA:OBA:MPDA 10:6:4 Polymer

|  | ASTM Method | As Molded | I | II | III |
|---|---|---|---|---|---|
| Annealing Cycle |  |  |  |  |  |
| Tensile Strength, psi | D-638 | 12,400 | 26,500 | 26,400 | 26,100 |
| Percent Elongation | D-638 | 3.7 | 12.1 | 15 | 12.0 |
| Flexural Strength, psi | D-790 | 28,100 | 32,500 | 31,900 | — |
| Flexural Modulus, psi | D-790 | 674,000 | 652,000 | 619,000 | — |
| Izod, ft-lb/in notch | D-756 | 1.5 | 3.5 | 4.2 | — |
| H.D.T. @ 264 psi |  | 513 | 532 | 530 | — |
| Shrinkage,[a] percent |  | — | 0.7 | 0.6 | 0.9 |

I 16 hr @ 495° F., 24 hr @ 505, 24 @ 519.
II 30 hr @ 495, 15 @ 508, 20 @ 515, 24 169 520.
III 24 hr @ 509, 24 @ 520.
[a] Of the D1708 T-bar.

EXAMPLE 7

A copolymer was prepared similar to the procedure set forth in Example 6, but having the ratio of TMA:OBA:MPDA of 10:4:6.

Samples of this copolymer were injection molded and then annealed under different conditions to determine the effect of annealing upon physical properties and dimensional stability of the test specimens. Results of the mechanical property tests are listed in Table VI. Annealing cycles are also set forth in Table VI.

TABLE VI

Effect of Annealing Cycle on the Properties of
the Injection Molded 10:4:6 TMA:OBA:MPDA Polymer

|  | ASTM Method | As Molded | I | II | III |
|---|---|---|---|---|---|
| Annealing Cycle |  |  |  |  |  |
| Tensile Strength, psi | D-638 | 19,400 | 25,700 | 25,700 | 24,100 |
| Percent Elongation | D-638 | 6.9 | 15 | 15 | 9.8 |
| Flexural Strength, psi | D-790 | 32,500 | 32,100 | 32,800 | — |
| Flexural Modulus, psi | D-790 | 653,000 | 600,000 | 676,000 | — |
| Izod, ft-lb/in notch | D-756 | 2.1 | 2.1 | 3.1 | — |
| H.D.T. @ 264 psi | D-648 | 519 | 547 | 550 | — |
| Shrinkage,[a] percent |  |  | 0.4 | 0.47 | 0.7 |

I 30 hr @ 495° F., 15 @ 508, 20 @ 515, 24 @ 520.
II 24 hr @ 509, 24 @ 520.
III 24 hr @ 520.
[a] Of the D1708 T-bar.

EXAMPLE 8

Preparation of TMA:OBA:MPDA 10:6:4
Copolymer Prepared From 90% Acylated Diamines A copolymer was prepared similar to the procedure set forth in Example 6 except that additional acetic anhydride was used such that the diamines would be 90% acylated.

The copolymer had an inherent viscosity of 0.7. The sample was injection molded and annealed. Its mechanical properties are listed in Table VII.

TABLE VII

Mechanical Properties of 10:6:4 Trimellitic
Anhydride:Oxybisaniline:Metaphenylenediamine
Polymer Prepared from 90% Acylated Diamines

|  | ASTM Method | Unannealed | Annealed[a] |
|---|---|---|---|
| Tensile Strength, psi | D-638 | 13,100 | 25,100 |
| Percent Elongation | D-638 | 3.5 | 11.5 |
| Flexural Strength, psi | D-790 | 23,900 | 31,600 |
| Flexural Modulus, psi | D-790 | 710,000 | 673,000 |
| Izod, ft-lb/in notch | D-756 | 1.4 | 3.7 |
| Heat Distortion Temperature @ 264 psi |  | 467° F. | 519° F. |

[a] Annealing cycle: 16 hr @ 490° F., 24 hr @ 504° F., 24 hr @ 510° F., 24 hr @ 520° F.

EXAMPLE 9

This example illustrates the continuous melt preparation of 10:6:4 TMA:OBA:MPDA copolymer using 90% acylated diamines.

A twenty-five gallon stirred kettle was charged with 18,000 g (90 mole) of oxybisaniline, 6480 g (60 mole) of metaphenylenediamine, and 12 l. (12,600 g) of acetic acid. To this stirred mixture under nitrogen was added 27,560 g (270 mole) of acetic anhydride over a period of 12 minutes while the skin of the jacketed kettle was water cooled. During the addition, the temperature of the kettle contents increased from 91° F. to 250° F. Trimellitic anhydride, 28,800 g (150 mole) was added to the kettle over a period of 5 minutes during which time the temperature of the contents dropped to 190° F. This mixture was heated to 240° F. by passing steam through the kettle's jacket. This mixture was continuously metered at a rate of 13,200 g/hr into an electrically heated (skin temperature 640° F.) helical anchor stirred reactor. The feed stream into this reactor was maintained at approximately 150 psi and the stream was heated to a temperature of 420°–440° F. The reactor content was maintained at 2,500–3,000 g and a melt temperature of 575°–600° F. Distillate was collected at a rate of 6,300–6,400 g/hr and product was pumped out of the reactor by a gear pump at a rate of 6,750–6,850 g/hr into a water bath. The product polymer had an inherent viscosity of 0.29 in N-methylpyrrolidone @25° C. and 0.5% w/v concentration.

This polymer was passed through an 8.2 ft long Egan twin screw reactor having 3.5 in diameter screws, operating at 26 RPM and a throughput of 66–70 lb/hr. The four zone temperatures were set at 550°, 630°, 670°, and 640° F. and melt temperature indicators in these zones showed temperatures in the range of 600°–626°, 672°–689°, 679°–696°, and 695°–724° F. The inherent viscosity of the polymer increased to 0.66 to 0.80 during this operation.

We claim:

1. A process for the preparation of random linear injection moldable amideimide and amide copolymers having an inherent viscosity of about 0.6 to 3.0 which process comprises reacting fully or partially acylated aromatic diamines, wherein at least half of the diamines utilized in the reaction are acylated in the presence of $C_2$ through $C_8$ containing aliphatic anhydrides or acids, with aromatic tricarboxylic acid anhydrides, or mixtures of aromatic dicarboxylic acids and aromatic tricarboxylic acid anhydrides in a molar ratio of about 9:1 to about 1:9 at a temperature of about 450° to 750° F., and wherein the molar ratio of the diamines to the anhydride or acid and anhydride mixture is about 0.9:1 to 1.1:1.

2. The process of claim 1 wherein the acid is isophthalic acid.

3. The process of claim 1 wherein the tricarboxylic acid anhydride compound is trimellitic anhydride.

4. The process of claim 1 wherein about 70 to 100 percent of the aromatic diamine is acylated.

5. The process of claim 4 wherein aromatic diamines contain one benzene ring or two benzene rings joined directly or by stable linkages consisting of

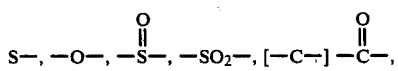

or methylene radicals.

6. The process of claim 4 wherein the acylated diamines are prepared from oxybisaniline and metaphenylene diamine.

7. The process of claim 6 wherein the molar ratio of the oxybisaniline to the metaphenylene diamine is in the range of about 8:2 to about 2:8.

8. An injection moldable random linear polyamide-imide copolymer prepared according to the process of claim 1 and comprising units of:

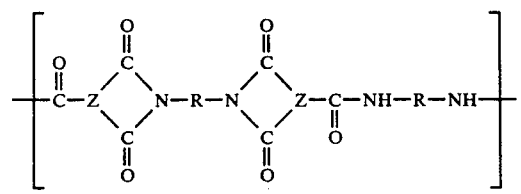

and units of:

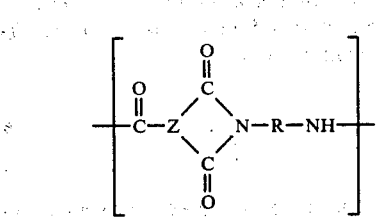

wherein "Z" is a trivalent benzene ring or lower alkyl substituted trivalent benzene ring; R comprises $R_1$ and $R_2$, $R_1$ and $R_2$ are divalent aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

9. The copolymer of claim 8 wherein $R_1$ is

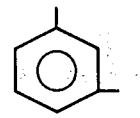

and $R_2$ is

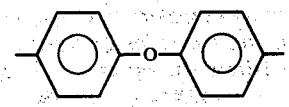

10. The copolymer of claim 8 wherein Z is a trivalent benzene ring, $R_1$ is

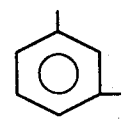

$R_2$ is

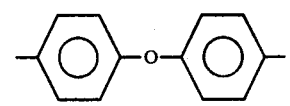

and wherein the concentration range runs from about 20 mole percent of the $R_1$ containing units and about 80 mole percent of the $R_2$ containing units to about 80 mole percent of the $R_1$ containing units and about 20 mole percent of the $R_2$ containing units.

11. The copolymer of claim 10 wherein the concentration range runs from about 40 mole percent of the $R_1$ containing units and about 60 mole percent of the $R_2$ containing units to about 60 mole percent of the $R_1$ containing units and about 40 mole percent of the $R_2$ containing units.

12. An injection moldable random linear polyamideimide copolymer prepared according to the process of claim 1 comprising units of

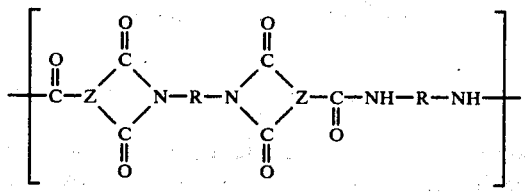

and units of

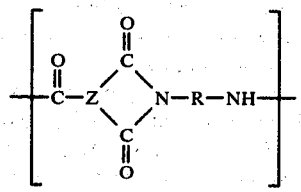

and units of

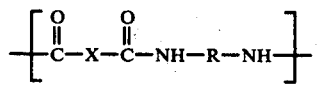

wherein "Z" is a trivalent benzene ring; R comprises $R_1$ or a mixture of $R_1$ and $R_2$, $R_1$ and $R_2$ are divalent aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO$_2$— and —S— radicals, and said $R_1$ and $R_2$ containing units run from about 10 mole percent $R_1$ containing units and 90 mole percent $R_2$ containing units to about 90 mole percent $R_1$ containing units to about 10 mole percent $R_2$ containing units and X is a divalent aromatic radical.

13. The copolymer of claim 12 wherein X is and $R_1$ is

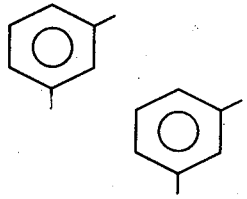

14. A continuous process for the preparation of random linear injection moldable amide-imide and amide copolymers having an inherent viscosity of about 0.6 to 3.0 which continuous process comprises reacting fully or partially acylated aromatic diamines, wherein at least half of the diamines utilized in the reaction are acylated in the presence of $C_2$ through $C_8$ containing aliphatic anhydrides or acids, with aromatic tricarboxylic acid anhydrides, or mixtures of aromatic dicarboxylic acids and aromatic tricarboxylic acid anhydrides in a molar ratio of about 9:1 to 1:9 at a temperature of about 450° to 750° F., and wherein the molar ratio of the diamines to the anhydride or acid and anhydride mixture is 0.9:1 to 1.1:1.

15. The process of claim 14 wherein the aromatic dicarboxylic acid is isophthalic acid.

16. The process of claim 14 wherein the tricarboxylic acid anhydride compound is trimellitic anhydride.

17. The process of claim 14 wherein about 70 to 100 percent of the aromatic diamine is acylated.

18. The process of claim 14 wherein the acylated diamines are prepared from oxybisaniline and metaphenylene diamine.

19. The process of claim 18 wherein the molar ratio of the oxybisaniline to the metaphenylene diamine is in the range of about 8:2 to about 2:8.

* * * * *

UNITED STATES PATENT OFFICE
CERTIFICATE OF CORRECTION

Patent No. 4,309,528              Dated January 5, 1982

Inventor(s) Robert G. Keske and James R. Stephens

It is certified that error appears in the above-identified patent and that said Letters Patent are hereby corrected as shown below:

Patent reads:

| Col. | Line | |
|---|---|---|
| 3 | 32 | "para- and meta-" should read --*para*- and *meta*- -- |
| 7 | 35 | "24 169 520" should read --24    520-- |
| 7 | 68 | "Shrinkage, $^a$" should read --Shrinkage, $^a$ percent-- |
| 8 | 46 | "12 1." should read --121 moles-- |
| 9 | 14 | "amideimide" should read --amide-imide-- |
| 9 | 44 | "S-," should read -- -S-, -- |
| 2 | 3 | "X is and $R_1$ is" should read --X is-- |
| 2 | 11 | please insert --and $R_1$ is-- |

Signed and Sealed this

Twentieth Day of July 1982

[SEAL]

Attest:

GERALD J. MOSSINGHOFF

Attesting Officer           Commissioner of Patents and Trademarks